Figure 1:
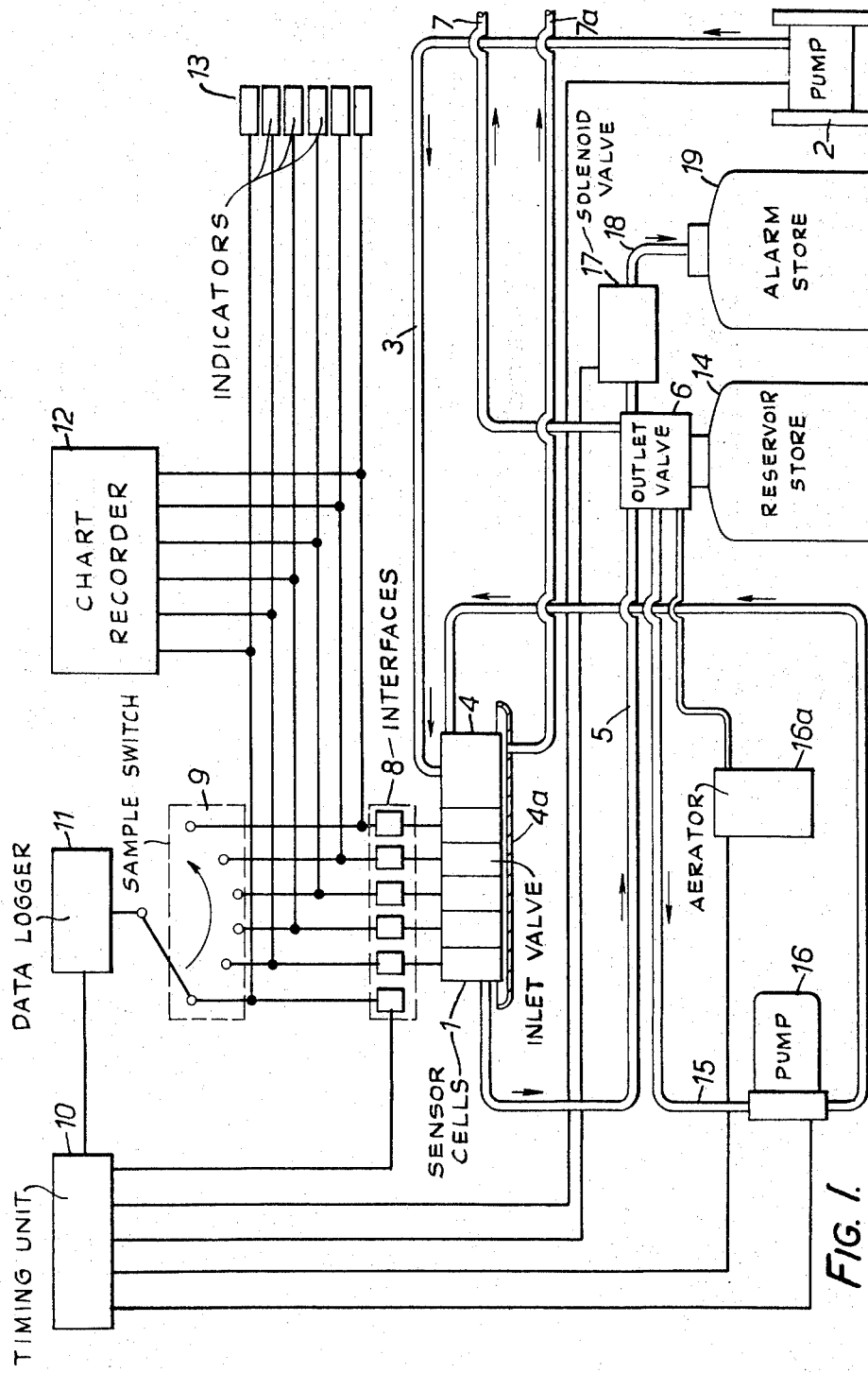

United States Patent
Wall et al.

[15] 3,698,238
[45] Oct. 17, 1972

[54] FLUID TESTING APPARATUS

[72] Inventors: Reginald Victor Wall; Harold Rodney Sven Page, both of Dorset, England

[73] Assignee: Plessey Handel und Investments A.G., Zug, Switzerland

[22] Filed: Feb. 9, 1971

[21] Appl. No.: 113,971

[52] U.S. Cl. .................................. 73/53, 73/61.1 R
[51] Int. Cl. .............................................. G01n 11/00
[58] Field of Search ................... 73/53, 61 R, 61.1 R

[56] References Cited

UNITED STATES PATENTS

| 3,214,964 | 11/1965 | Davis | 73/53 |
| 3,250,118 | 5/1966 | Johnson, Jr. | 73/53 |
| 3,287,960 | 11/1966 | Abercrombie, Jr. | 73/53 |

FOREIGN PATENTS OR APPLICATIONS 231,884   5/1969   U.S.S.R. .................. 73/61.1 R

Primary Examiner—Louis R. Prince
Assistant Examiner—Joseph W. Roskos
Attorney—Scrivener, Parker, Scrivener & Clarke

[57] ABSTRACT

Fluid testing apparatus comprising a number of sensor cells serially connected in a fluid pipe-line each responsive to a particular characteristic of a fluid passed therethrough and a store for calibration liquid, from which calibration liquid is released to the sensor cells, consequent upon the operation of a valve. The apparatus may also comprise a further valve which is operated when fluid of a particular characteristic is detected so that this fluid can be stored for subsequent analysis.

5 Claims, 2 Drawing Figures

FLUID TESTING APPARATUS

This invention relates to fluid testing apparatus.

According to the present invention fluid testing apparatus comprises a plurality of sensor cells serially connected in a fluid pipe line for providing an indication in respect of predetermined characteristics of a fluid passing therethrough, the cells being operatively associated with indicator and/or recorder means.

The indicator and/or recording means may comprise a data logger.

Signals derived in dependence upon the operative state of the cells may be sampled sequentially by the data logger such that the said logger is operatively associated with the cells on a time sharing basis.

The apparatus may be operated under the control of signals derived from timing means in accordance with a predetermined program. Thus signals derived from the cells may be sampled sequentially and logged, the sampling and logging operations being repeated at predetermined intervals so that the characteristics of a fluid passing through the pipeline may be recorded at said intervals.

Alternatively to or in addition to said data logger an alarm means may be provided which is operated in dependence upon the state of one or more of said cells. When an alarm has been given it may be arranged that a sample of the fluid present in the cells is stored. For this purpose a solenoid valve may be operated when the alarm is given so as to re-route fluid from the cells to an alarm store container for analysis.

It may also be arranged that at intervals a fluid of known character is passed from a calibration store container through the cells for calibration purposes, so that sets of standard signals may be recorded by the data logger.

It is especially contemplated that the apparatus may be utilized for water testing, and cells may be provided to measure one or more of the following characteristics of the water: conductivity, temperature, suspended solids, ph value, chloride or some other specific ion and dissolved oxygen. The apparatus may include pumping means for passing water either continuously or at intervals through the serially connected cells and for passing, when required, liquid to the alarm store container and/or for passing liquid from the calibration store for calibration purposes through serially connected sensor cells.

In addition to this pump a pump may be provided externally of the apparatus which may for example be submerged on a river or reservoir bed for pumping liquid from the river or reservoir to the apparatus.

Figure 2:
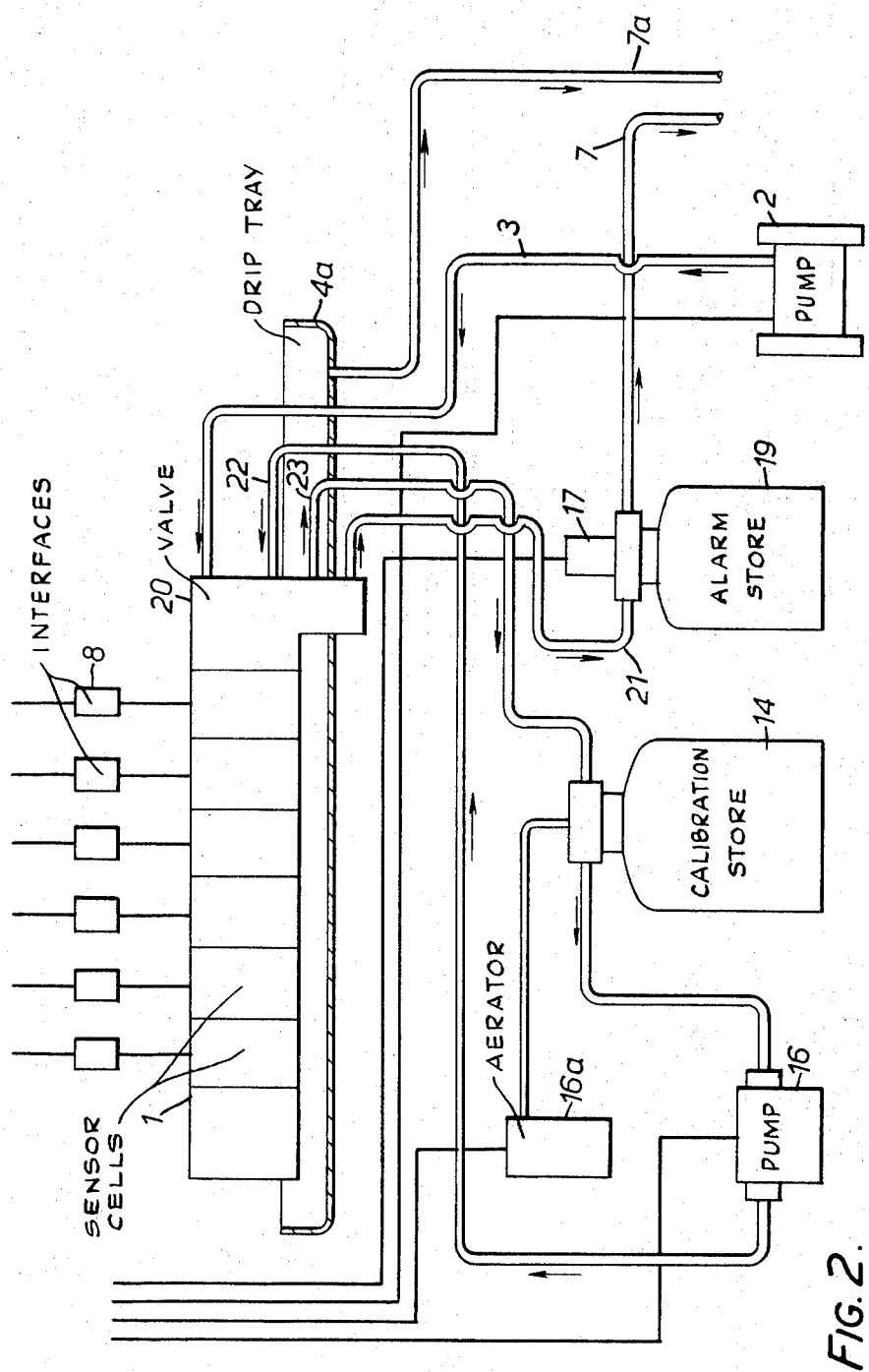

In addition to the data logger and alarm system a chart recorder and/or direct reading meters may be provided which are fed with signals derived from the sensor cells. Some exemplary embodiments of the invention will now be described with reference to the accompanying drawings in which:

FIG. 1 is a generally schematic block diagram of water testing station apparatus, and FIG. 2 is a block diagram similar to FIG. 1 but showing an alternative valve arrangement, the same numerical designations being used where appropriate in both Figures. Referring now to FIG. 1, the apparatus comprises five serially connected sensor cells 1 to which water to be tested is pumped from a submerged pump 2 along a pipe line 3. The cells each comprise a similar hollow container fabricated from a transparent plastics material opposite ends of each container being respectively provided with male and female fluid tight couplings so that serial connection of the cells end to end is facilitated. The hollow body part of each cell is adapted to receive a sensor device of any suitable known kind chosen in accordance with the desired parameter or characteristic of the fluid to be sensed. Electrical signals produced in dependence upon a characteristic are fed from the sensor device of each cell on conductors provided for the purpose. Since each cell is similar and presents a similar resistance to fluid pumped therethrough the flow rate through each cell is substantially the same. Since the cells are fabricated from transparent material the condition of the interior of each cell having regard to algae growth for example may readily be checked by visual inspection.

Water from the pump 2 passes through an inlet valve 4; through the sensor cells; along a pipe 5, and through an outlet valve 6 to an outlet pipe 7. An outlet drain pipe 7a is also provided from spill tray 4a associated with the sensor cells. Output signals from the sensor devices of the cells respectively representative of the parameters or characteristics of the fluid pumped are fed via sensor adaptors 8 one for each cell to a sample switch 9. The sensor adaptors 8 are conventional electronic circuit interfaces which convert the signals from respective cells to corresponding d.c. signals having a value between 0 and 5 volts suitable for feeding to indicator, recorder or other apparatus. Thus the output signal from one of the cells which may be indicative of the temperature of the water pumped, might vary by a few millivolts say over the relevant temperature range between 0° and 25° C. This signal which changes with temperature by a relatively small amount is fed from the sensor device to a corresponding one of the sensor adaptors 8 which provides a d.c. signal in the range 0 to 5 volts where 0 volts corresponds to 0° C and 5 volts corresponds to 25° C. The sample switch 9 is operated under the control of a timing unit 10 which also feeds a data logger 11 so that signals derived from the sensor cells 1 via adaptor units 8 are sampled sequentially by the data logger 11 consequent upon operation of the sample switch 9 under the control of the timing unit 10. Signals from the sensor cell adaptor units 8 as well as being applied through the sample switch 9 to the data logger, are also applied to a chart recorder 12 and to direct reading meters 13. The chart recorder and direct reading meters are provided one for each sensor cell.

In order that the sensor cells may be calibrated a reservoir store 14 of calibration liquid is provided, calibration liquid being passed from the calibration liquid store 14 along the pipeline 15 through a calibration pump 16 which operates under the control of the timing unit 10 to the sensor cells 1 via inlet valve 4. Liquid from the sensor cells is returned along the coupling pipe 5 to the outlet valve where it may either be exhausted to the outlet pipe 7 or returned to the calibration liquid store 14 in dependence upon the operative state of the outlet valve 6. In order that the calibration liquid may be aerated an aerator 16a is operatively associated with the valve 6.

In the event that one or more of the sensor cells provide a signal which is recognized in the data logger as having a predetermined character which may be undesirable, an alarm is operated and a signal is passed from the timing unit to operate a solenoid valve 17 which routes water from the outlet valve 6 through the pipeline 18 to an alarm store 19. In this way it may be arranged that a sample of the water which caused an alarm signal to be initiated by the data logger is stored in the alarm store for subsequent analysis.

It will be appreciated that operation of the equipment is controlled by the timing unit 10 so that the sensor cells are sampled at predetermined intervals and in a predetermined sequence. The timing mechanism may comprise a battery driven clock which initiates a sample cycle every 15, 30 or 60 minutes. The data logger may conveniently comprise a magnetic tape recording system and it may also include a punch tape translator which translates the recorded data to a punch paper tape. The sensor devices of the cells may be of any known type and the cells are enclosed within a light tight container to minimize bacteriological growth therein. Clearly the submerged pump 2 may be operated continuously or more conveniently it may be operated at intervals a time lag being programmed between the start of the pump and the sampling interval in order that the sensor cells may be purged of stale water.

Turning now to FIG. 2 an arrangement similar to FIG. 1 is shown wherein the timing unit data logger, direct reading meters and six channel potentiometric chart reader of FIG. 1 have been omitted. Also omitted in FIG. 2 is the outlet valve 6 and the inlet valve 4 a composite change-over valve 20 being substituted.

In operation of the equipment shown in FIG. 2 water from the pump 2 is normally fed via the inlet pipe 3 and the valve 20 through the sensor cells 1. The sensor cells are interlocking units having male and female coupling elements as described with reference to FIG. 1, but the cells for use in the arrangement of FIG. 2 have an integral fluid return path provided such that fluid pumped from the inlet pipe 3 via the valve 20 is enabled to circulate through the cells and return to the coupling outlet pipe 21 which connects to the outlet pipe 7 via the solenoid valve 17. The valve 20 is a change-over valve arrangement which in one position enables the fluid to be tested to be pumped from the inlet pipe 3, through the cells to the outlet pipe 21, or alternatively in another position enables calibration liquid from store 14 to be circulated via calibration liquid inlet pipe 22 through the cells and returned through calibration liquid outlet pipe 23 to the store 14. In use of the arrangement shown schematically in FIG. 2, when a test cycle has been completed, liquid pumped into the cells by the pump 2 is allowed to drain from the sensor cells before a further testing operation is commenced or before a calibration cycle is commenced. This draining operation serves two purposes. Firstly by allowing the cells to dry the build up of algae is reduced and secondly when calibration liquid is pumped through the system the risk of contamination of the calibration liquid by the fluid under test is obviated. In order to facilitate draining of the fluid from the system the valve may be provided with an air vent which may be opened automatically or otherwise to prevent air-locks in the system and enable the fluid to drain from the cells to the outlet pipe 7.

The valve 20 may be electrically operated or alternatively it may be arranged that the valve 20 is operated by the pressure of the liquid pumped through the system. This affords a saving of electrical power as well as simplifying in some respects the design of the valve 20.

It will be appreciated that various modifications may be made to the system as described with reference to FIGS. 1 and 2 without departing from the scope of the invention. For example the sensor cells of the arrangement described with reference to FIG. 2 may be enclosed within a light tight container thereby to provide a further insurance against the build up of algae in the cells.

What we claim is:

1. Fluid testing apparatus comprising a plurality of sensor cells serially connected in a fluid pipe-line, means operatively associated with the cells for providing an indication in respect of predetermined characteristics of a fluid passed through the cells, a store for calibration fluid and valve means operatively associated with the sensor cells such that fluids to be tested or alternatively fluid from the said store may be passed through the sensor cells in accordance with the operative state of the valve means.

2. Fluid testing apparatus as claimed in claim 1, comprising a control valve operative when a predetermined characteristic is sensed by a sensor cell for diverting fluid passed through the cells possessing said characteristic, and a fluid storage container into which such fluid is diverted.

3. Fluid testing apparatus as claimed in claim 2, including electronic interfaces, one for each cell, and indicator means, signals from said cells being passed via said interfaces to said indicator means.

4. Fluid testing apparatus as claimed in claim 3, comprising a data logger, and switch means via which signals from said interfaces are fed sequentially to said data logger.

5. Fluid testing apparatus as claimed in claim 4, including timing means providing control signals for the switch means to facilitate sequential operation of said switch means in accordance with a predetermined programme.

* * * * *